(12) United States Patent
Hocker et al.

(10) Patent No.: US 10,069,860 B1
(45) Date of Patent: *Sep. 4, 2018

(54) PROTECTION FOR COMPUTING SYSTEMS FROM REVOKED SYSTEM UPDATES

(71) Applicant: International Business Machines Corporation, Armonk, NY (US)

(72) Inventors: Michael D. Hocker, Staatsburg, NY (US); Brandon S. Johnson, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/432,305

(22) Filed: Feb. 14, 2017

(51) Int. Cl.
*H04L 29/06* (2006.01)
*H04L 9/32* (2006.01)
*H04L 9/30* (2006.01)
*H04L 9/08* (2006.01)
*G06F 8/65* (2018.01)

(52) U.S. Cl.
CPC .......... *H04L 63/1466* (2013.01); *G06F 8/65* (2013.01); *H04L 9/0877* (2013.01); *H04L 9/3066* (2013.01); *H04L 9/3247* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 5,261,055 A | 11/1993 | Moran et al. |
| 5,878,256 A | 3/1999 | Bealkowski et al. |
| 6,581,159 B1 | 6/2003 | Nevis et al. |
| 7,069,452 B1 | 6/2006 | Hind et al. |
| 7,987,449 B1 | 7/2011 | Marolia et al. |
| 8,117,293 B1 | 2/2012 | Anderson |
| 2005/0021968 A1 | 1/2005 | Zimmer et al. |

(Continued)

OTHER PUBLICATIONS

Rocker et al., "Protection for Computing Systems From Revoked System Updates", U.S. Appl. No. 15/718,072, filed Sep. 28, 2017.

(Continued)

*Primary Examiner* — Christopher Revak
(74) *Attorney, Agent, or Firm* — Michael Purdham

(57) ABSTRACT

A computing system may be protected from revoked system updates. A computing system receives an object and scans it for revocation updates to a security structure of the computing system. The security structure is a monotonically nondecreasing collection of segments containing data on whether a system update is revoked and a system update's status as revoked signifies the revoked system update can no longer be used by the computing system. Based upon scanning the object, the computing system identifies and validates a revocation update. The computing system resolves the revocation update by applying the revocation update to the security structure, by adding or changing one or more segments of the security structure identified by the revocation update, in response to determining that the revocation update is valid, or by denying application of the revocation update to the security structure in response to determining that the revocation update is invalid.

20 Claims, 4 Drawing Sheets

(56) References Cited

U.S. PATENT DOCUMENTS

| | | | |
|---|---|---|---|
| 2005/0132351 A1 | 6/2005 | Randall et al. | |
| 2008/0163338 A1* | 7/2008 | Micali | G06Q 20/02 |
| | | | 726/2 |
| 2009/0064125 A1* | 3/2009 | Venkatachalam | G06F 8/65 |
| | | | 717/170 |
| 2011/0208975 A1 | 8/2011 | Sibert | |
| 2013/0111455 A1* | 5/2013 | Li | G06F 21/572 |
| | | | 717/169 |
| 2013/0205288 A1* | 8/2013 | Sohm | G05B 15/02 |
| | | | 717/168 |
| 2014/0130151 A1 | 5/2014 | Krishnamurthy et al. | |
| 2014/0173581 A1 | 6/2014 | Grinberg et al. | |
| 2015/0082322 A1* | 3/2015 | Stribling | G06F 9/541 |
| | | | 719/313 |
| 2015/0220319 A1 | 8/2015 | Weiss et al. | |

OTHER PUBLICATIONS

Accelerated Examination Support Document, U.S. Appl. No. 15/718,072, dated Sep. 27, 2017, 31 pages.
IBM, List of IBM Patents or Patent Applications Treated as Related, Sep. 27, 2017, 2 pages.
De Cock, et al., "Threat Modelling for Security Tokens in Web Applications", Communications in Multimedia Security, Springer, US, 2005. 11 pages.
Nystrom, et al., "UEFI Networking and Pre-OS Security", Intel Technology Journal, vol. 15, Issue 1, 2011. 22 pages.

* cited by examiner

PROTECTION FOR COMPUTING SYSTEMS FROM REVOKED SYSTEM UPDATES

BACKGROUND

The present disclosure relates to system updates to computing systems, including hardware security modules (HSMs), and more specifically, to controlling application of such updates via a security structure which contains segments identifying revoked updates.

HSMs, such as secure cards or cryptographic cards come in a variety of form factors (e.g., Peripheral Component Interconnect Express (PCIe) cards, external devices). These HSMs are self-contained physical computing systems which can securely process data and cryptographic functions for data encryption and digital signing, secure storage of signing keys, or custom cryptographic applications. These custom cryptographic applications may include financial applications (such as blockchain), Public Key Infrastructure applications, smart card applications, and/or custom proprietary solutions. Features of such HSMs include the ability to remain secure from both physical and logical attacks to continue operating as intended, without unauthorized modification.

SUMMARY

Disclosed herein are embodiments of a method and computer program product for protecting a computing system from revoked system updates. A computing system receives an object. The computing system scans the object for revocation updates to a security structure of the computing system. The security structure is a monotonically nondecreasing collection of segments containing data on whether a system update is revoked and a system update's status as revoked in the security structure signifies the revoked system update can no longer be used by the computing system. Based upon scanning the object, the computing system identifies a revocation update. The computing system validates the revocation update. The computing system resolves the revocation update by application of the revocation update to the security structure, by adding or changing one or more segments of the security structure identified by the revocation update, in response to determining that the revocation update is valid, or by denying application of the revocation update to the security structure in response to determining that the revocation update is invalid.

Also disclosed herein are embodiments of a system for protecting a computing system from revoked system updates. An interface, located in or connected to the computing system, receives an object. A processor located within a computing system, and in communication with a memory that is also located within a computing system is configured to scan the object for revocation updates to a security structure of the computing system. The security structure is a monotonically nondecreasing collection of segments containing data on whether a system update is revoked and a system update's status as revoked in the security structure signifies the revoked system update can no longer be used by the computing system. Based upon scanning the object, the computing system identifies a revocation update. The computing system validates the revocation update. The computing system resolves the revocation update by application of the revocation update to the security structure, by adding or changing one or more segments of the security structure identified by the revocation update, in response to determining that the revocation update is valid, or by denying application of the revocation update to the security structure in response to determining that the revocation update is invalid.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
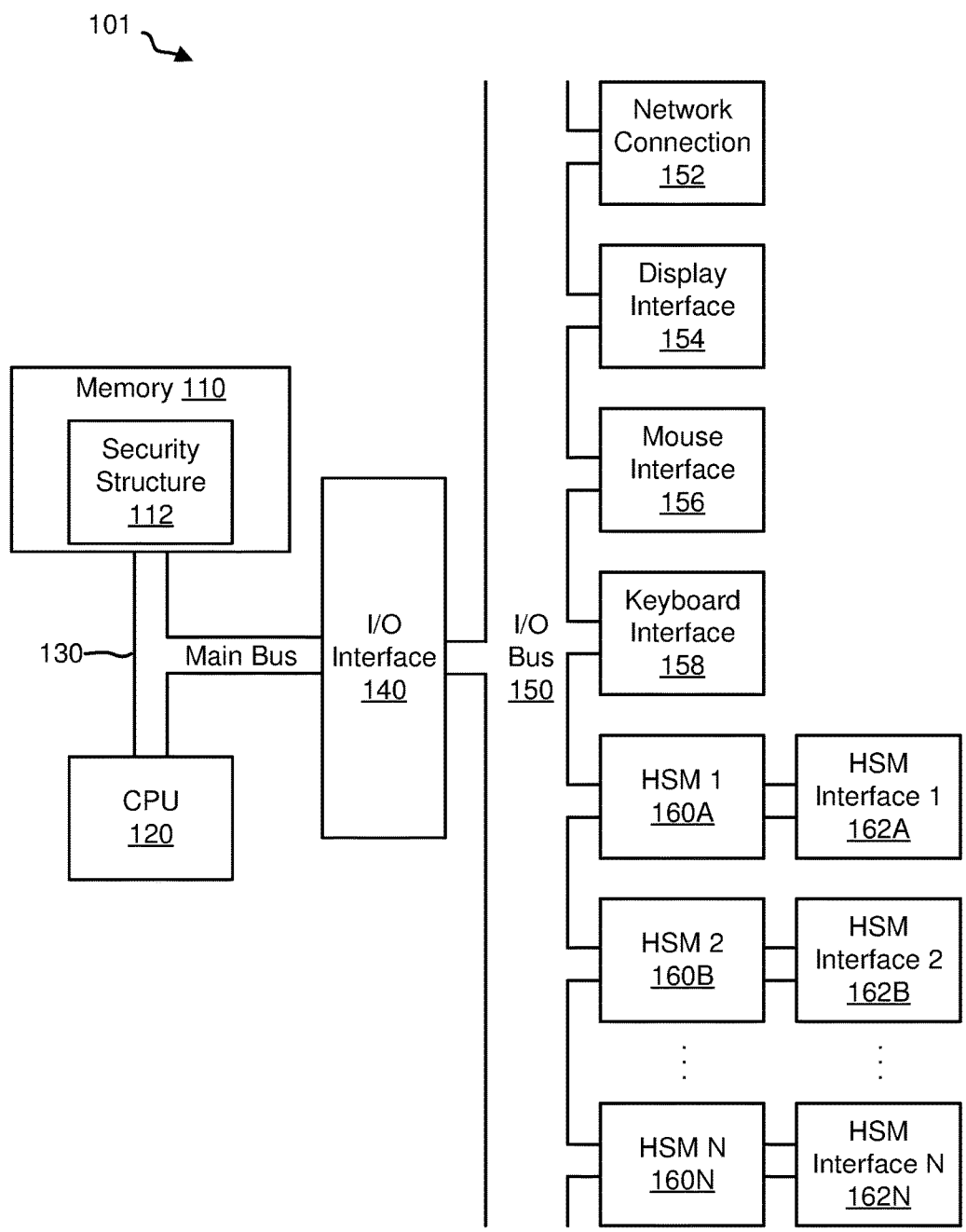
FIG. 1 depicts representative components of an example computer system including one or more hardware security modules (HSMs) in accordance with embodiments of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to system updates to computing systems, including hardware security modules (HSMs), and more particular aspects relate to controlling application of such updates via a security structure which contains segments identifying revoked updates. While the present disclosure is not necessarily limited to such applications, various aspects of the disclosure may be appreciated through a discussion of various examples using this context.

HSMs are self-contained physical computing systems which can securely process data and cryptographic functions. HSMs include secure cards or cryptographic cards, and may come in a variety of form factors (e.g., Peripheral Component Interconnect Express (PCIe) cards, external devices). Features of such cards include the ability to remain secure from both physical and logical attacks to continue operating as intended, without unauthorized modification. HSMs include one or more secure cryptoprocessor chips to prevent tampering and bus probing. Some HSMs include dual power supplies or battery backups and field replaceable components to ensure high availability for customers and ensure business continuity. Some HSMs may be contained in an enclosure, which may limit the use of field replaceable components to exterior components such as a cooling fan, or may prevent the use of any field replaceable components to provide further physical security of the HSM. Due to the nature of performed tasks, HSMs may be certified to internationally recognized standards to provide users with independent assurance that their design, implementation, and cryptographic algorithms are sound. An HSM includes various communication pathways for communication with a host computer or other device. The pathways may be internal, such as a Peripheral Component Interconnect (PCI) or PCIe bus, or a Serial AT Attachment (SATA) connection. The pathways may be external, such as a Universal Serial Bus (USB) port, a FireWire port, an external SATA (eSATA) port, or a Thunderbolt port. Other pathways, either wired or wireless, may also be included on the HSM, which would be apparent to those skilled in the art.

HSMs can be used in any application that uses digital keys. The functions of an HSM include onboard secure cryptographic key generation, onboard secure cryptographic key storage and management, use of cryptographic and sensitive data material, and offloading application servers for complete asymmetric and symmetric cryptography. HSMs can use asymmetric key pairs and certificates used in public-key cryptography, symmetric keys, or arbitrary data. Additional possible applications include data encryption and digital signing, and custom cryptographic applications including financial applications such as PIN generation and verification, Internet business and web serving applications, Public Key Infrastructure applications, smart card applications, and custom proprietary solutions. Some HSMs also support elliptic curve cryptography (ECC).

Various processes exist to update firmware, software, operating systems, and device hardware functionality. Collectively these types of updates will be referred to herein as system updates. These system update processes can be performed for a variety of reasons, including to patch a critical defect such as a security vulnerability. Typically, these processes are reversible such that a user can return the firmware, software, operating system, and/or device hardware functionality to a prior version(s). While procedures exist to add prior firmware versions to a prohibited list or forbidden database, these procedures can be undone or worked around such that the prior firmware versions can be restored in spite of the list or database. It would be beneficial, especially in the context of a critical defect such as a security vulnerability in a previously signed and released component, that a computing system have the ability to selectively and irreversibly revoke a version of firmware, software, operating system, and/or device hardware functionality, such that returning to such version is forever impossible. This would allow a user or administrator to permanently fix a critical defect without concern that the critical defect could later be exploited again. It would be possible to prevent restoration of firmware, software, operating system, and/or device hardware functionality to any prior version as a simpler expedient; however, this carries with it the risk that the new version renders the computing system inoperable due to a faulty version, an interrupted update process, or other problem.

As such, embodiments of the present disclosure include a procedure wherein versions of firmware, software, operating system, and/or device hardware functionality are not automatically ineligible for restoration, but can be permanently revoked when necessary or appropriate to do so. In some embodiments, system updates will contain a unique identifier a computing system can use to distinguish different system updates. In some embodiments, the unique identifier can be the version number of the system update or a cryptographic hash of the system update binary. In some embodiments the unique identifier may be version or date agnostic; for example, multiple instances of the same version may have separate identifiers and may be allowed and revoked based upon the separate identifier. Permanent revocation may operate only in one direction, such that a list, database, or other system may only have system updates revoked and never changed back to allowed. Such an irreversible revocation provides additional protection to the computing system and would prevent malicious parties from converting revoked system updates to allowed to take advantage of a security vulnerability.

A way to work around the irreversible revocation system could entail a version of a system update being reissued as a new version with only as many changes as necessary for the security feature to recognize it as a different version. For example, a computer system is operating on version 1.1 and upgrades to version 1.2. Later, version 1.1 is revoked, by revoking the identifier tied to version 1.1, such that the computing system can no longer downgrade to version 1.1. In the advent that version 1.2 has some critical flaw, a second version 1.1 can be authorized with a new identifier. The computer system would then allow the second version of 1.1 because it is tied to a new—non-revoked—identifier.

FIG. 1 depicts representative components of an example computer system 101 including one or more hardware security modules (HSMs) that may be used in accordance with embodiments of the disclosure. It is appreciated that individual components may have greater complexity than represented in FIG. 1; components other than or in addition to those shown in FIG. 1 may be present; and the number, type, and configuration of such components may vary. Several particular examples of such complexities or additional variations are disclosed herein. The particular examples disclosed are for example purposes only and are not necessarily the only such variations. The computer system 101 may comprise a memory 110, a central processing unit (CPU) 120, a main bus 130, and an input/output interface (herein I/O or I/O interface) 140. The main bus 130 may provide communication pathways for the other components of the computer system 101.

The memory 110 of the computer system 101 may be comprised of a memory controller (not depicted), one or more memory modules (not depicted), and a security structure 112. In some embodiments, the memory 110 may comprise a random-access semiconductor memory, storage device, or storage medium (either volatile or non-volatile) for storing data and programs. In some embodiments the security structure 112 may be located within another component within computer system 101, including within HSMs 1 through N, 160A-160N.

In some embodiments, the computer system 101 may contain multiple processors typical of a relatively large system, each of which could contain CPUs and the CPU 120 may be part of a larger processor comprised of one or more CPUs (not depicted). The CPU 120 may additionally be comprised of one or more memory buffers or caches (not depicted) that provide temporary storage of instructions and data for the CPU. The CPU 120 may perform instructions on input provided from the caches or from the memory 110 and output the result to caches or the memory. The CPU 120 may be comprised of one or more circuits configured to perform one or more methods consistent with embodiments of the disclosure.

The I/O interface 140 may be coupled to an I/O bus 150, a network connection 152, a display interface 154, a mouse interface 156, and a keyboard interface 158. The I/O interface 140 may connect the main bus 130 to the I/O bus 150. The I/O interface 140 may direct instructions and data from the CPU 120 and memory 110 to the various interfaces of the I/O bus 150. The I/O interface 140 may also direct instructions and data from the various interfaces of the I/O bus 150 to the CPU 120 and memory 110. The various interfaces may comprise the network connection 152, the display interface 154, the mouse interface 156, and the keyboard interface 158. The display interface 154 may facilitate the connection of a display (not depicted) for displaying visual output to a user of the computer system. The mouse interface 156 and the keyboard interface 158 may facilitate connection of a mouse and keyboard (not depicted), respectively, for receiving input from a user of the computer system 101. In some embodiments, the various interfaces may comprise a subset of the aforementioned interfaces (e.g., a server in an industrial application may not include a mouse interface 156 or keyboard interface 158). Likewise, some interfaces may not be depicted but also are connected to the I/O bus 150 (e.g., a system used for backup purposes may contain various storage media interfaces such as a floppy disk interface, a tape drive interface, or an optical drive interface).

In the example of FIG. 1, communicatively coupled to the I/O interface 140 are HSMs 1 through N 160A-160N which may be present to securely process data and cryptographic functions. HSMs 160A-160N are self-contained computing systems and may comprise many components (not depicted) including secure cryptoprocessor chip(s), other processor(s), memory units, field-programmable gate arrays (FPGAs), application-specific integrated circuits (ASICs), real-time clocks, power regulators, tamper controllers, batteries, random number generators, and other components as appropriate. The FPGAs in HSMs 160A-160N are integrated circuits configurable by a customer or designer after manufacturing. The ASICs in HSMs 160A-160N are customized pieces of computer hardware designed to perform one or more specific functions. The memory units in HSMs 160A-160N may be comprised of random access memory (RAM), read-only memory (ROM), erasable programmable read-only memory (EPROM or Flash memory), dynamic random access memory (DRAM), static random access memory (SRAM), or battery backup random access memory (BBRAM). HSMs 160A-160N may each have a corresponding HSM interface 162A-162N beyond the connection of each HSM to the I/O interface. HSM interfaces 162A-162N may be PCI or PCIe buses, SATA connections, USB ports, FireWire ports, eSATA ports, Thunderbolt ports, or other interfaces both wired or wireless, which would be apparent to those skilled in the art. The various interfaces of the I/O bus 150 may also comprise the HSMs 1 through N 160A-160N. HSMs 160A-160N may receive objects, including system updates, through the I/O Bus 150 or HSM interfaces 162A-162N, which communicate these received objects to appropriate components within each HSM.

Logic modules throughout the computer system 101—including but not limited to the memory 110, the CPU 120, and the I/O interface 140—may communicate failures and changes of one or more components to a hypervisor or operating system (not depicted). The hypervisor or the operating system may be able to allocate the various resources available in the computer system 101 and track the location of data in memory 110 and of processes assigned to the CPU 120. In embodiments that combine or rearrange elements, aspects of the logic modules' capabilities may be combined or redistributed. These variations would be apparent to one skilled in the art.

Figure 2:
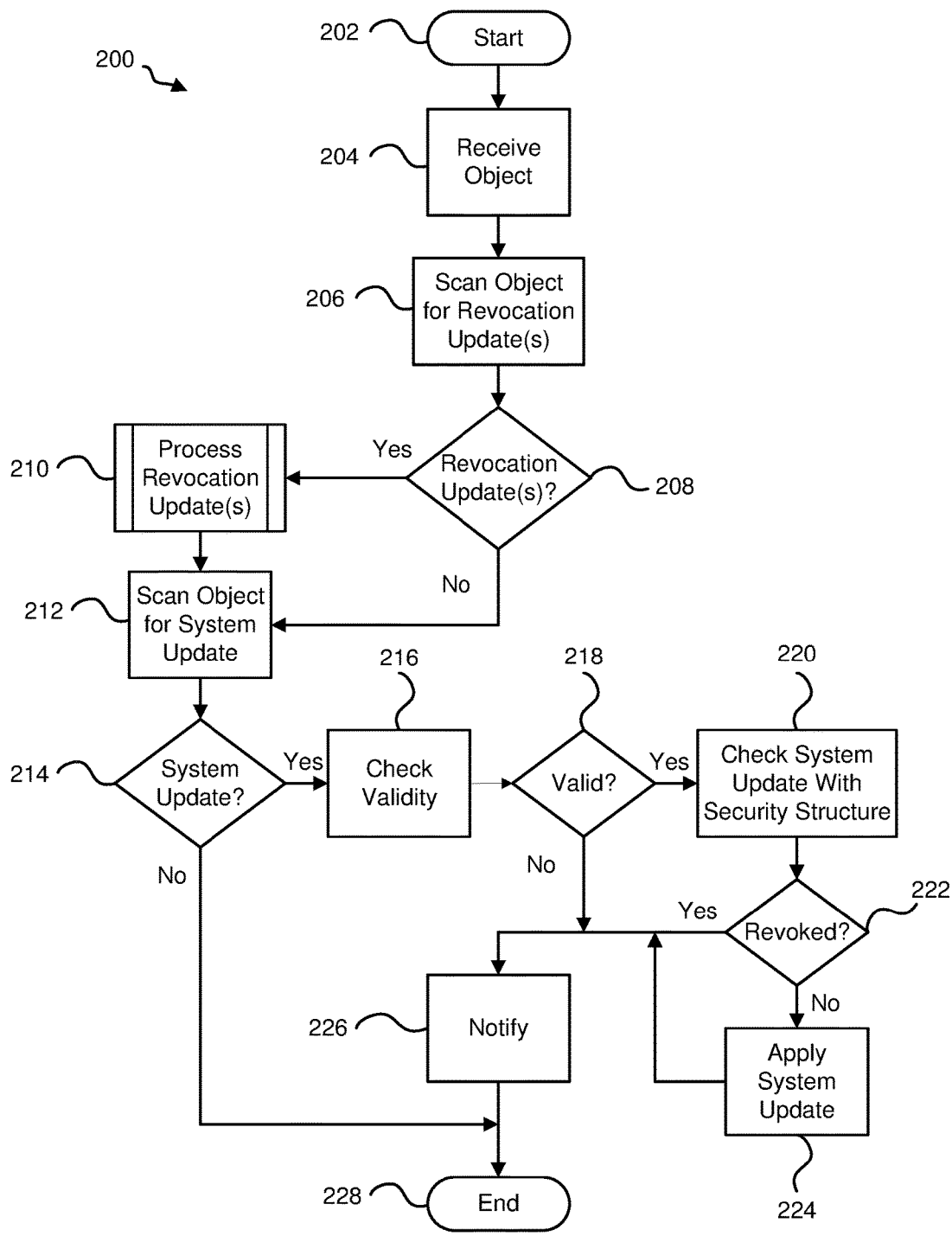
FIG. 2 depicts an example method for a computing system receiving and addressing a revocation update and/or system update, in accordance with embodiments of the present disclosure.
Figure 4:
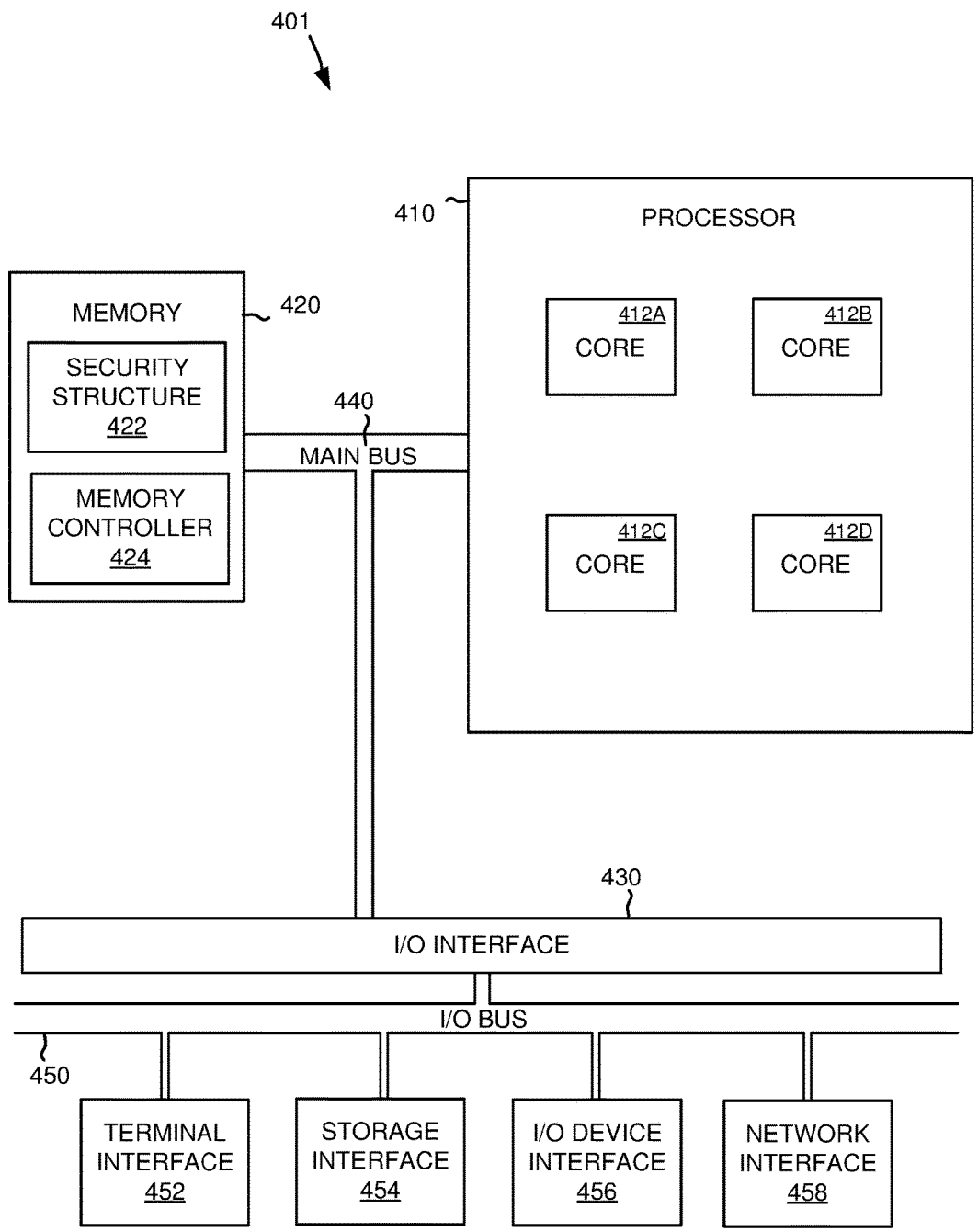
FIG. 4 depicts representative components of another example computer system, in accordance with embodiments of the present disclosure.

FIG. 2 depicts an example method 200 for a computing system receiving and addressing a revocation update and/or system update, in accordance with embodiments of the present disclosure. Method 200 may include more or less steps than those depicted. Method 200 may include steps in different orders than those depicted, including, but not limited to the specific variations highlighted herein. Method 200 can be performed by a general computing system or a more specific hardware security module (HSM). Example computers that may perform method 200 are illustrated in FIG. 1 and FIG. 4.

In some embodiments, method 200 may be executed simultaneously by multiple devices, such as in multiple HSMs inside a larger computing system, such as HSMs 160A-160N in FIG. 1. Method 200 may also be executed by multiple devices in a serial fashion, such as by a first HSM inside a larger computing system, followed by another such HSM once the first has finished, and so on until all HSMs to be updated have performed the method. In more detail, method 200 may be accomplished in a serial fashion by a computing system receiving an object and communicating that object to the I/O interface. The I/O interface may communicate that object to the I/O bus including an address value for a first HSM. That first HSM may perform method 200 and communicate with the I/O interface that it has completed the method. Then then I/O interface may communicate the object to the I/O bus with an address value for a second HSM. This process may repeat until all HSMs have performed the method. Additionally, in some embodiments, if the first HSM encounters an error, it may communicate this error to the I/O interface that the object should not be communicated to other HSMs. In some embodiments, a first HSM may receive a command to perform method 200 and after completion, instruct a second HSM to perform method 200.

From start 202, the computing system receives an object at 204. This object may be received via a network connection from a remote source or via a local input device (e.g., a device attached to the computer such as by USB, FireWire, eSATA, Thunderbolt). The object may be encrypted with a public key and the computing system may decrypt the received object with a private key stored in a secure portion of the computing system. The received object may be in the form of only a revocation update. The received object may contain multiple elements, such as a firmware update, a hardware functionality update, a revocation update, or a combination thereof.

At 206, the computing system scans the received object for a revocation update. The form of the revocation update may vary. A revocation update may be a single field of data or may be a field of data and an associated command, such as a command to "add," "remove," or something similar. The form of the revocation update will correspond to the form of a security structure, as will be described below. Application of a given revocation update may alter the contents of the security structure (e.g., to mark as invalid or unusable signatures that correspond with various updates to computing system, to insert new segments, to update existing values associated with segments, to prevent the computer system from applying a given system update).

A given security structure may be composed of segments (e.g., defined contents or entries). A security structure can be a monotonically nondecreasing collection of these segments, meaning that segments may be changed or added, but never removed, such that the number of segments does not decrease. The form of the segments will vary and correspond to the form of the security structure. A given segment of a security structure is associated with a system update of a computer system that is no longer valid or useable to update the computer system. Many possible security structures may exist, meaning many possible forms of segments may exist.

A revocation update is typically in a format similar to a segment of a given security structure. A revocation update may include data, or data and commands, to affect one or more segments of a security structure. The security structure and its associated segments could be locally stored on the computing system or stored remotely and accessed by the computing system via a network connection. For example, the security structure may be a list of hash values associated with system updates, and a revocation update may take the form of a hash value and may additionally contain an instruction to add it to the list. In such a security structure, the segments may be the hash values. If this security structure is employed, system updates would contain a hash value as an identifier.

In a second example, the security structure may be a database of possible system updates with each possible system update having a corresponding entry indicating if the system update is allowed or revoked. In the second example a revocation update may take the form of an instruction to change the allowed entry to a revoked entry for a given system update. The entry in such an embodiment could be a single bit with a 0 indicating allowed and a 1 indicating revoked. In such a security structure, the segments may be the combination of system update and corresponding entry. If this security structure is employed, system updates should contain an identifier which is present in the database as a possible system update.

In a third example, the security structure may be a set of key value pairs with the keys corresponding to system updates and the values indicating whether the system update is allowed or revoked, in which case a revocation update may take the form of an instruction to change the value associated with a key to revoked or to add a new key value pair for a new system update. In such a security structure, the segments may be the key value pairs. If this security structure is employed, system updates should contain a key as an identifier. The present disclosure is not limited to these examples of possible security structures and corresponding revocation updates, segments, and identifiers.

At 208, the computing system determines if a revocation update is present based on the results of the scan in 206. If the computing system determines a revocation update is present at 208, then the computing system proceeds to process the revocation update at 210, which is depicted further in FIG. 3. Once the revocation update is processed at 210, or if it was determined that no revocation update was present at 208, the computing system further scans the object for a system update at 212. This may comprise reading the object and searching for an identifier of a system update in a form consistent with the security structure of the computing system.

At 214, the computing system determines if a system update is present. If the computing system determines there is no system update present at 214, method 200 ends at 228. If a system update is present, the computing system checks the validity of the system update at 216. The validity of the update may be determined by checking a digital signature using asymmetric cryptography including a public key and a private key, a certificate issued by a certificate-issuing authority, or other means apparent to those skilled in the art. This check could include retrieval of a hash from a vendor of the computing system and comparison against the system update. The system update being hashed and the digest of the hash matching the retrieved hash may indicate a valid system update. A result of invalid could result from the lack of a—or an improper—digital signature, certificate, or similar feature. Checking the validity of the system update may include comparing the data included in the system update with a hash to ensure no corruption of the system update. Checking the validity of a system update could comprise utilizing a verification tool to ensure the text of any included plaintext files are not garbled or corrupted. Checking the validity of the system update may also include ensuring an identifier of the form associated with the security structure is present. The computing system may determine a system update without such identifier is not valid.

If the system update is invalid at 218, the computing system may create a notification at 226 to be communicated to the user, administrator, or other person, or stored in a log or other repository of notifications. The notification at 226 may be provided by a daemon or process operating on the computer system. The notification communicated at 226 may be constructed based on a notification engine or other subroutine designed to handle various input and react accordingly in an appropriate manner. This notification may include varying amounts of information in different embodiments, potentially indicating the system update was not applied, that this occurred due to it being invalid, an error code indicating such information, and/or that an error occurred. For example, a system update is found invalid and the computer system emails the user with identifying information of the system update and its invalidity. In a second example, a system update is not valid and the system displays a pop-up to an administrator notifying them that the computing system refuses to apply the system update due to its invalidity. After notification, method 200 ends at 228.

If the system update is a valid system update at 218, the computing system checks the system update with the security structure at 220 (which may have been updated during 210 if a revocation update was present). Alternatively, the computing system could check the system update with the security structure before determining if the update is valid. The computing system may check if the system update is present in a segment of the security structure as a revoked system update. A system update can also be said to have the status of revoked in the security structure, signifying the revoked system update can no longer be used by the computing system. As discussed above, the security structure and its segments may take various forms. The process of this check may mean the computing system searches a list for a matching hash value corresponding to the system update, the computing system performs a table look up check on a database with the system update's identifier and returns the associated revoked or allowed entry, the computing system performs a look up check on a list of keys and returns the associated value of revoked, allowed, or that no key exists, or the computing system performs a check of the security structure in any other manner to check whether the system update is revoked or not. These processes may also be performed by looping through each segment of the security structure and comparing the identifier of the system update to the segment, with the loop terminating once all segments have been checked.

If the system update is revoked in the security structure (or has the status of revoked in the security structure) at 222, the computing system may create a notification at 226 to be communicated to the user, administrator, or other person, or stored in a log or other repository of notifications. This notification may include varying amounts of information in different embodiments, potentially indicating the system update was not applied, that this occurred due to it being revoked, an error code indicating such information, and/or that an error occurred. After notification, method 200 ends at 228.

If the system update is not revoked in the security structure (or does not have the status of revoked in the security structure) at 222, the computing system applies the system update to the computing system at 224. Applying the system update at 224, may include rebooting the computing system. After application, the computing system may create a notification at 226 to be communicated to the user, administrator, or other person, or stored in a log or other repository of notifications. This notification may include varying amounts of information in different embodiments, potentially indicating the system update was applied and/or that the system update passed revocation and validity checks. After notification, method 200 ends at 228.

Figure 3:
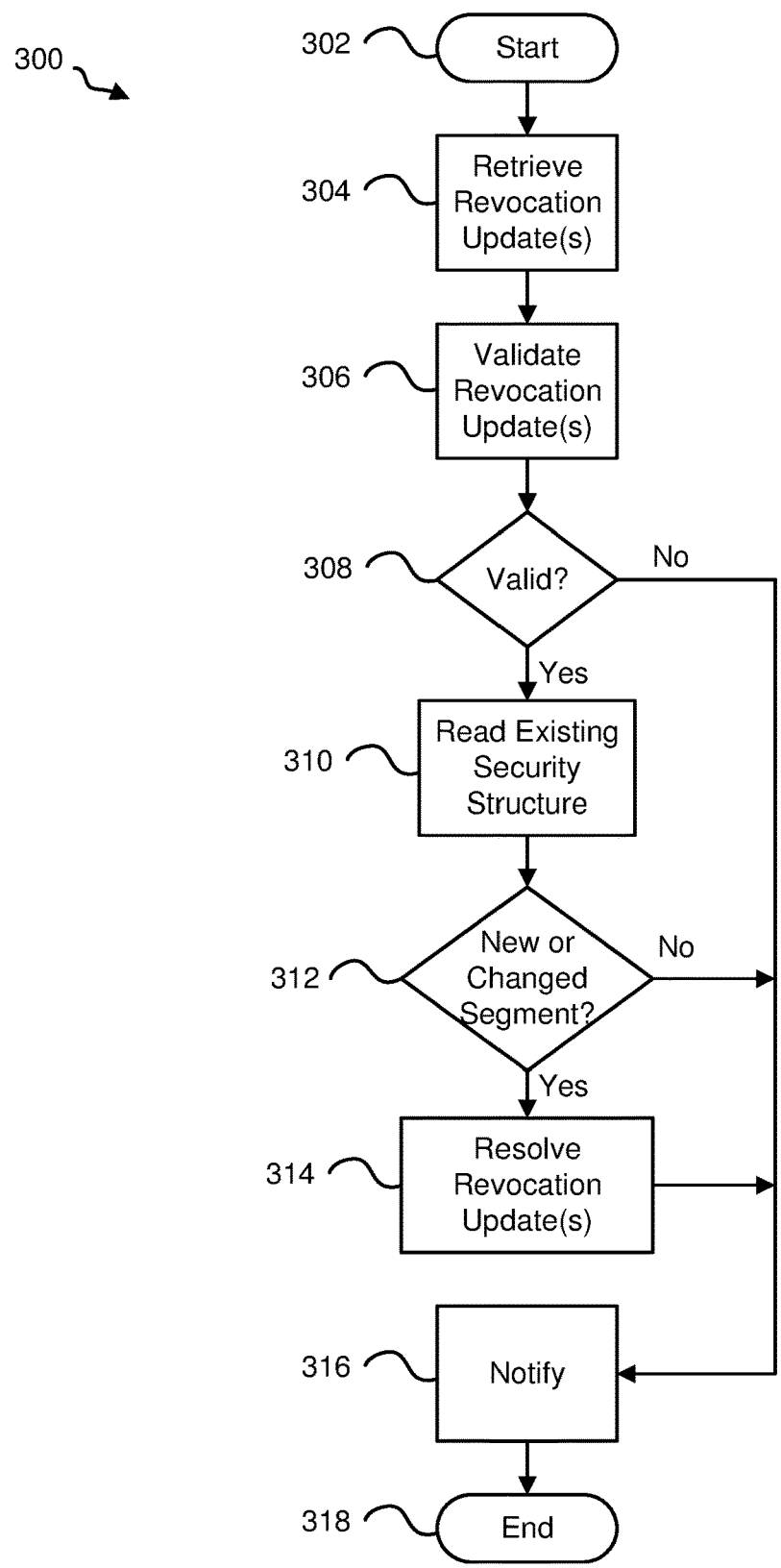
FIG. 3 depicts an example method for a computing system receiving and addressing a revocation update including adding it to the security structure if appropriate, in accordance with embodiments of the disclosure.

FIG. 3 depicts an example method 300 for a computing system processing a revocation update including adding it to the security structure if appropriate, in accordance with embodiments of the disclosure. Method 300 may include more or less steps than those depicted. Method 300 may include steps in different orders than those depicted, including, but not limited to the specific variations highlighted herein. Method 300 may be contained in Method 200 as step 210 for processing revocation update(s) or may exist as a separate method. Method 300 can be performed by a general computing system or a more specific hardware security module (HSM). Example computers that may perform method 300 are illustrated in FIG. 1 and FIG. 4.

In some embodiments, method 300 may be executed simultaneously by multiple devices, such as in multiple HSMs inside a larger computing system, such as HSMs 160A-160N in FIG. 1. Method 300 may also be executed by multiple devices in a serial fashion, such as by a first HSM inside a larger computing system, followed by another such HSM once the first has finished, and so on until all HSMs to be updated have completed. In more detail, method 300 may be accomplished in a serial fashion by a computing system receiving a revocation update and communicating that revocation update to the I/O interface. The I/O interface may communicate that revocation update to the I/O bus including an address value for a first HSM. That first HSM may perform method 300 and communicate with the I/O interface (or the first HSM may directly communicate with another HSM) that it has completed the method. Then then I/O interface may communicate the revocation update to the I/O bus with an address value for a second HSM. This process may repeat until all HSMs have performed the method. Additionally, in some embodiments, if the first HSM encounters an error, it may communicate this error to the I/O interface that the object should not be communicated to other HSMs.

From start 302, a computing system retrieves a revocation update or updates at 304. A revocation update may have been previously obtained by the computing system and may have been received as part of an object as discussed above regarding FIG. 2. Retrieval of the revocation update at 304 will not be necessary in all embodiments. The revocation update(s) may be retrieved via a network connection from a remote source or from a local input device (e.g., a device attached to the computer such as by USB, FireWire, eSATA, Thunderbolt). In some embodiments a computing system, including an HSM, could be restricted to retrieving the revocation update through a PCIe bus to prevent retrieval from a different port or interface. In other embodiments a computing system, including an HSM, could be allowed to retrieve the revocation update from any interface or a different subset of interfaces.

As noted, method 300 may involve one or more revocation updates. In the event multiple revocation updates are received together, method 300 could be performed on a single revocation update at a time and performed as many times as necessary to process all revocation updates received. Method 300 could also be performed on all revocation updates at once. In either scenario, the results for the revocation updates may be different for each revocation update. For example, if a computing system receives two revocation updates, the computing system may determine later in method 300 that a first revocation update does not add a new segment or change an existing segment of the security structure because it is already present and not apply the segment to the security structure, but may determine that a second revocation update does add a new segment or change an existing segment of the security structure and resolve the revocation update by applying that revocation update to a segment of the security structure.

Upon retrieval, the computing system checks the validity of the revocation update(s) at 306. Alternatively, the validity of the revocation update(s) may be checked prior to retrieval of the entire revocation update(s) by first retrieving any portions of the revocation update(s) necessary for validity. The validity of the revocation update(s) may be determined by checking a digital signature using asymmetric cryptography including a public key and a private key, a certificate issued by a certificate-issuing authority, or other means apparent to those skilled in the art. This check could include retrieval of a hash from a vendor of the computing system and comparison against the revocation update. The revocation update being hashed and the digest of the hash matching the retrieved hash may indicate a valid revocation update. A result of invalid could result from the lack of a—or an improper—digital signature, certificate, or similar feature. Checking the validity of the revocation update may include comparing the data included in the revocation update with a hash to ensure no corruption of the revocation update. Checking the validity of a system update could comprise utilizing a verification tool to ensure the text of any included plaintext files are not garbled or corrupted.

At 308, the computing system determines the results of the validity check as valid or not. If the revocation update(s) are not valid update(s), the computing system may create a notification at 316 to be communicated to the user, administrator, or other person, or stored in a log or other repository of notifications. The notification at 316 may be provided by a daemon or process operating on the computer system. The notification communicated at 316 may be constructed based on a notification engine or other subroutine designed to handle various input and react accordingly in an appropriate manner. This notification may include varying amounts of information in different embodiments, potentially indicating the revocation update(s) were not applied, that this occurred due to the revocation update(s) not being valid, an error code indicating such information, and/or that an error occurred. For example, a revocation update is found invalid and the computer system emails the user with identifying information of the revocation update and its invalidity. In a second example, a revocation update is not valid and the system displays a pop-up to an administrator notifying them that the computing system refuses to apply the revocation update due to its invalidity. After notification, method 300 ends at 318.

If the revocation update(s) are valid update(s) at 308, the computing system reads the existing security structure at 310. This read may involve checking for the presence of existing segment(s) within the security structure and reading what is contained within those segments. The computing system determines if revocation update(s) add new segment(s) to the security structure or change existing segment(s) at 312. As discussed above, these segments could take many forms depending on the security structure, including hash values, entries in a database, or key value pairs. The process for this determination may be that the computing system searches a list for a matching hash value corresponding to the revocation update(s), the computing system performs a table look up check on a database with the system update(s)' identifier(s) and determines if the revocation update(s) change the existing associated revoked or allowed entry(ies), the computing system performs a look up check on a list of keys and determines if the revocation update(s) change the associated value(s) of revoked or allowed or that no key(s) exist, or the computing system performs a check of the security structure in any other manner to check whether the revocation update(s) add new segment(s) or change existing segment(s).

The process for this determination at 312 may also be performed by looping through each segment of the security structure and verifying that at least one segment would be altered by each revocation update, with the loop terminating once all segments have been checked. This process of checking whether the revocation update(s) add new segment(s) to the security structure or change existing segment(s) before applying the revocation update(s) may prevent the same revocation update(s) from being applied multiple times. This could be important if a security structure had a maximum capacity of allowed segments such that applying the same segment many times could prevent future revocation updates from functioning properly.

In some embodiments, additional or alternative measures may be employed to prevent undesirable effects depending on the form of the security structure. For example, instead of determining if a revocation update adds a new segment or changes an existing segment, a computing system could count how many segments are added. In other embodiments, instead of, or in addition to counting how many segments are added, the computing system could count either or both of how many segments are changed or remain unchanged. The process for counting added or changed segments would proceed as discussed above for determining if a segment is added or changed, with the additional step of counting how many times this occurred. The process for counting how many segments remain unchanged would be the reverse of the process for determining how many segments would be changed. In these alternative scenarios, the computing system may reject application of a revocation update if any of the numbers of segments added, changed, or remaining unchanged does not satisfy respective predetermined limit conditions (e.g., less than 10, greater than 100, greater than or equal to 1000).

Limit conditions for the number of segments added or the number of segments changed should be upper limits, meaning that the number must be less than the limit (or less than or equal to in some embodiments) to satisfy the limit condition. For example, in an embodiment where the number of segments added is counted, a limit condition may be that the number must be less than 10 or else the revocation update will be rejected, so an example revocation update which adds 5 segments satisfies the condition and will not be rejected. Conversely, limit conditions for the number of segments unchanged should be lower limits, meaning that the number must be greater than the limit (or greater than or equal to in some embodiments) to satisfy the limit condition. For example, in an embodiment where the number of segments unchanged is counted, a limit condition may be that the number must be greater than 100 or else the revocation update will be rejected, so an example revocation update which leaves unchanged only 20 segments does not satisfy the condition and may be rejected.

Other additional or alternative measures would be to determine the percentages of added, changed, or remaining unchanged segments compared before and after application of a revocation update. In these scenarios, the computing system may reject application of a revocation update if a designated one of the percentage of segments added, changed, or remaining unchanged does not satisfy a respective predetermined limit value (e.g., less than 10%, greater than 50%, greater than or equal to 90%). As with the counting embodiments, limit conditions for the percentage of segments added or the percentage of segments changed should be upper limits, and limit conditions for the percentage of segments unchanged should be lower limits.

These embodiments using counting or percentages would prevent unauthorized or unintended revocation of more system updates at once than desired. It would also prevent the unauthorized or unintended result of too few (or no) available system updates for future use, if for example all or nearly all segments in a database of possible updates were changed to revoked. The processes of reading the security structure, checking if the revocation update(s) add new segment(s) or change existing segment(s), or counting how many segments are added, changed, or remain unchanged, could be performed before determining if the revocation update(s) are valid.

If the revocation update(s) do not add new segment(s) or change existing segment(s), or the count of how many segments are added, changed, or remain unchanged satisfies one or more respective predetermined limit conditions at 312, the computing system may create a notification at 316 to be communicated to the user, administrator, or other person, or stored in a log or other repository of notifications. This notification may include varying amounts of information in different embodiments, potentially indicating the revocation update(s) were not applied, that this occurred due to the revocation update(s) being already present, the revocation update(s) exceeded the allowed number of operations, an error code indicating such information, and/or that an error occurred. After notification, method 300 ends at 318 is reached.

If the revocation update(s) do add new segment(s) or change existing segment(s), or the count of how many segments are added, changed, or remain unchanged does not satisfy one or more respective predetermined limit conditions at 312, the computing system resolves the revocation update(s) at 314. In some embodiments, resolution of the revocation updates at 314 may be application of the revocation update(s) by adding or changing segments of the security structure. How the computing system accomplishes application of the revocation update(s) will depend on the type of security structure present and could be the addition of hash value(s) to a list, adding new entry(ies) to a database or changing existing entry(ies) in a database, adding new key value pair(s) or changing key value pair(s), or other means as appropriate for the security structure.

In other embodiments, resolution of the revocation updates will additionally include determining if the revocation update(s) call for removal of segment(s) from the security structure or for changing segment(s) of the security structure (which indicate system update(s) are revoked) to allowed. If the computing system determines that either of these conditions are true, resolution of the revocatio n update(s) may be denial of application of the revocation update(s). Denying application of such revocation update(s)

makes the security structure a one-way function whereby allowed system updates may be irreversibly revoked. Such an irreversible revocation provides additional protection to the computing system and would prevent malicious parties from converting revoked system updates to allowed system updates to take advantage of a security vulnerability.

After resolution of the revocation update(s) at 314, the computing system creates a notification at 316 to be communicated to the user, administrator, or other person, or stored in a log or other repository of notifications. This notification may include varying amounts of information in different embodiments, potentially indicating the revocation update(s) were applied, the computing system denied application based on an invalid operation, and/or that the revocation update(s) passed validity and new/changed segment checks. After notification, method 300 ends at 318.

FIG. 4 depicts representative components of an example computer system 401 that may be used, in accordance with embodiments of the present disclosure. It is appreciated that individual components may vary in complexity, number, type, and\or configuration. The particular examples disclosed are for example purposes only and are not necessarily the only such variations. In the example of FIG. 4, the computer system 401 comprises a processor 410, memory 420, an input/output interface (herein I/O or I/O interface) 430, and a main bus 440. The main bus 440 provides communication pathways for one or more of the other components of the computer system 401. In some embodiments, the main bus 440 may connect to other components such as a specialized digital signal processor (not depicted).

In the example of FIG. 4, the processor 410 of the computer system 401 is comprised of cores 412A, 412B, 412C, 412D (collectively 412). It is to be understood that although the example of FIG. 4 depicts four cores in processor 410, more or fewer cores can be used in other embodiments. The processor 410 may additionally include one or more memory buffers or caches (not depicted) that provide temporary storage of instructions and data for the cores 412. The cores 412 may perform instructions on input provided from the caches or from the memory 420 and output the result to caches or the memory. The cores 412 may be comprised of one or more circuits configured to perform one or methods consistent with embodiments of the present disclosure. In some embodiments, the computer system 401 may contain multiple processors 410. In some embodiments, the computer system 401 may be a single processor 410 with a singular core 412.

In the example shown in FIG. 4 the memory 420 of the computer system 401 includes a security structure 422 and a memory controller 424. In some embodiments, the memory 420 may comprise a random-access semiconductor memory, storage device, or storage medium (either volatile or non-volatile) for storing data and programs. In some embodiments, the memory may be in the form of modules (e.g., dual in-line memory modules). The memory controller 424 can communicate with the processor 410, facilitating storage and retrieval of information in the memory 420. The memory controller 424 may communicate with the I/O interface 430, facilitating storage and retrieval of input or output in the memory 420. In some embodiments the security structure 422 may be located within another component within computer system 401.

In this example, the I/O interface 430 comprises an I/O bus 450, a terminal interface 452, a storage interface 454, an I/O device interface 456, and a network interface 458. The I/O interface 430 connects the main bus 440 to the I/O bus 450. The I/O interface 430 may direct instructions and data from the processor 410 and memory 420 to the various interfaces of the I/O bus 450. The I/O interface 430 may also direct instructions and data from the various interfaces of the I/O bus 450 to the processor 410 and memory 420. The various interfaces may include the terminal interface 452, the storage interface 454, the I/O device interface 456, and the network interface 458. In some embodiments, the various interfaces may include a subset of the aforementioned interfaces (e.g., an embedded computer system in an industrial application may not include the terminal interface 452 and the storage interface 454).

In some embodiments, computer system 401 may be a hardware security module (HSM). Such a computer system 401 may comprise many other components (not depicted) including secure cryptoprocessor chip(s), field-programmable gate arrays (FPGAs), application-specific integrated circuits (ASICs), real-time clocks, power regulators, tamper controllers, batteries, random number generators, and other components as appropriate. The FPGAs would be integrated circuits configurable by a customer or designer after manufacturing. The ASICs would be customized pieces of computer hardware designed to perform one or more specific functions. The I/O device interface 456 may additionally comprise PCI or PCIe buses, SATA connections, USB ports, FireWire ports, eSATA ports, Thunderbolt ports, or other interfaces both wired or wireless, which would be apparent to those skilled in the art (not depicted). Such a computer system 401 may be configured to receive objects through only a subset of its available interfaces.

Logic modules throughout the computer system 401—including but not limited to the memory 420, the processor 410, and the I/O interface 430—may communicate failures and changes to one or more components to a hypervisor or operating system (not depicted). The hypervisor or the operating system may allocate the various resources available in the computer system 401 and track the location of data in memory 420 and of processes assigned to various cores 412. In embodiments that combine or rearrange elements, aspects and capabilities of the logic modules may be combined or redistributed. These variations would be apparent to one skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for protecting a computing system from revoked system updates, the method comprising:
   receiving, by a computing system, an object;
   scanning, by the computing system, the object for revocation updates to a security structure of the computing system, wherein the security structure is a monotonically nondecreasing collection of segments containing data on whether a system update is revoked, and wherein a system update's status as revoked in the security structure signifies the revoked system update can no longer be used by the computing system;
   identifying, by the computing system and based upon scanning the object, a revocation update;
   validating, by the computing system, the revocation update; and
   resolving, by the computing system, the revocation update by application of the revocation update to the security structure, by adding or changing one or more segments of the security structure identified by the revocation update, in response to determining that the revocation update is valid, or denying application of the revocation update to the security structure in response to determining that the revocation update is invalid.

2. The method of claim 1, wherein the security structure is a list of hash values corresponding to system updates.

3. The method of claim 1, wherein resolving the revocation update comprises:
   reading, by the computing system, the security structure;
   determining, by the computing system, whether the revocation update has previously been applied to the security structure; and
   resolving, by the computing system, the revocation update by application of the revocation update to the security structure in response to determining that the revocation update has not previously been applied to the security structure, or resolving, by the computing system, the revocation update by denying application of the revocation update to the security structure in response to determining that the revocation update has previously been applied to the security structure.

4. The method of claim 1, wherein resolving the revocation update comprises:
   reading, by the computing system, the security structure;
   calculating, by the computing system, a count value wherein the count value is selected from the group consisting of the number of segments of the security structure application of the revocation update would add, the number of segments of the security structure application of the revocation update would change, and the number of segments of the security structure application of the revocation update would leave unchanged;
   comparing, by the computing system, the count value to a limit condition; and
   resolving, by the computing system, the revocation update by application of the revocation update to the security structure in response to the count value satisfying the limit condition, or resolving, by the computing system, the revocation update by denying application of the revocation update to the security structure in response to the count value not satisfying the limit condition.

5. The method of claim 1, wherein the object is encrypted with a public key, and wherein the method further comprises:
   decrypting, by the computing system, the received object with a private key stored in the computing system, wherein the private key is stored in a secure portion of the computing system.

6. The method of claim 1, wherein the validating the revocation update comprises:
   validating a digital signature of the revocation update.

7. The method of claim 1, wherein the resolving of the revocation update comprises:
   determining whether the revocation update calls for changing or removing a segment of the security structure such that application of the revocation update to the security structure would result in a revoked system update no longer being revoked; and
   denying application of the revocation update to the security structure in response to determining that the revocation update calls for changing or removing a segment of the security structure such that application of the revocation update to the security structure would result in a revoked system update no longer being revoked.

8. The method of claim 1, wherein the method further comprises:
   receiving, by the computing system, a system update;
   reading, by the computing system, the security structure;
   determining, by the computing system and based on reading the security structure, that the security structure does not indicate that the system update has a status of revoked; and
   allowing, by the computing system and based on the determination that the system update does not have a status of revoked, installation of the system update to the computing system.

9. The method of claim 1, wherein the method further comprises:
   receiving, by the computing system, a system update;
   reading, by the computing system, the security structure;
   determining, by the computing system and based on reading the security structure, that the security structure indicates that the system update has a status of revoked; and
   denying, by the computing system and based on the determination that the system update has a status of revoked, installation of the system update to the computing system.

10. The method of claim 9, wherein the system update is coupled with the object, and wherein the method further comprises:
    searching, by the computer system, the object for the system update.

11. The method of claim 9, wherein the method further comprises:
    outputting a notification to a user, administrator, or a log, by the computing system, of the denial of the installation of the system update to the computing system.

12. The method of claim 9, wherein the system update is selected from the group consisting of firmware updates, operating system updates, software updates, and device hardware functionality updates, and combinations thereof.

13. The method of claim 1, wherein the computing system is a hardware security module (HSM).

14. The method of claim 13, wherein the HSM includes a Peripheral Component Interconnect Express (PCIe) bus and includes a Universal Serial Bus (USB) port.

15. The method of claim 14, wherein the HSM only accepts revocation updates from the PCIe bus.

16. A computer program product for protecting a computing system from revoked system updates, the computer program product comprising a computer readable storage medium having program instructions embodied therewith, the program instructions executable by a computer to perform a method comprising:
    receiving, by a computing system, an object;
    scanning, by the computing system, the object for revocation updates to a security structure of the computing system, wherein the security structure is a monotonically nondecreasing collection of segments containing data on whether a system update is revoked, and wherein a system update's status as revoked in the security structure signifies the revoked system update can no longer be used by the computing system;
    identifying, by the computing system and based upon scanning the object, a revocation update;
    validating, by the computing system, the revocation update; and
    resolving, by the computing system, the revocation update by application of the revocation update to the security structure, by adding or changing one or more segments of the security structure identified by the revocation update, in response to determining that the revocation update is valid, or denying application of the revocation update to the security structure in response to determining that the revocation update is invalid.

17. The computer program product of claim 16, wherein the resolving of the revocation update comprises:
   determining whether the revocation update calls for changing or removing a segment of the security structure such that application of the revocation update to the security structure would result in a revoked system update no longer being revoked; and
   denying application of the revocation update to the security structure in response to determining that the revocation update calls for changing or removing a segment of the security structure such that application of the revocation update to the security structure would result in a revoked system update no longer being revoked.

18. The computer program product of claim 16, wherein the program instructions further comprises:
   receiving, by the computing system, a system update;
   reading, by the computing system, the security structure;
   determining, by the computing system and based on reading the security structure, that the system update matches a segment of the security structure; and
   denying, by the computing system and based on the determined match, installation of the system update to the computing system.

19. A system for protecting a computing system from revoked system updates the system comprising:
   an interface, the interface located in or connected to the computing system, wherein the interface receives an object;
   a memory, the memory located in a computing system; and
   a processor, the processor located in a computing system, the processor in communication with the memory, wherein the processor is configured to:
   scan the object for revocation updates to a security structure of the computing system, wherein the security structure is a monotonically nondecreasing collection of segments containing data on whether a system update is revoked, and wherein a system update's status as revoked in the security structure signifies the revoked system update can no longer be used by the computing system;
   identify based upon scanning the object, a revocation update;
   validate the revocation update; and
   resolve the revocation update by applying the revocation update to the security structure, by adding or changing one or more segments of the security structure identified by the revocation update, in response to determining that the revocation update is valid, or denying application of the revocation update to the security structure in response to determining that the revocation update is invalid.

20. The system of claim 19, wherein the resolving of the revocation update comprises:
   determine whether the revocation update calls for changing or removing a segment of the security structure such that application of the revocation update to the security structure would result in a revoked system update no longer being revoked; and
   deny application of the revocation update to the security structure in response to determining that the revocation update calls for changing or removing a segment of the security structure such that application of the revocation update to the security structure would result in a revoked system update no longer being revoked.

* * * * *